United States Patent

Hubbauer et al.

[15] 3,678,178
[45] July 18, 1972

[54] HIGH TEMPERATURE COMPRESSION SEAL TERMINAL

[72] Inventors: Philip Hubbauer, Clark; Edwin John McHenry, Millington, both of N.J.

[73] Assignee: Bell Telephone Laboratories, Incorporated, Murray Hill, N.J.

[22] Filed: Nov. 18, 1971

[21] Appl. No.: 200,098

[52] U.S. Cl..........................174/152 R, 136/168, 174/77 R
[51] Int. Cl....................................H01b 17/30, H01m 1/02
[58] Field of Search......................174/18, 23 R, 50.56, 77 R, 174/151, 152 R, 153 R; 136/135 R, 136 S, 168

[56] References Cited

UNITED STATES PATENTS

| | | | |
|---|---|---|---|
| 1,941,397 | 12/1933 | Grier | 174/153 R |
| 2,542,916 | 2/1951 | Fetterley | 174/153 R X |
| 2,794,062 | 5/1957 | McCall | 174/77 R |
| 2,957,041 | 10/1960 | Ziegler | 174/152 R |
| 3,109,055 | 10/1963 | Ziegler | 174/152 R |
| 3,472,701 | 10/1969 | Selover, Jr. et al. | 136/168 |

FOREIGN PATENTS OR APPLICATIONS

| | | | |
|---|---|---|---|
| 155,593 | 2/1939 | Austria | 174/152 R |

*Primary Examiner*—Laramie E. Askin
*Attorney*—R. J. Guenther et al.

[57] ABSTRACT

A battery seal terminal capable of withstanding high pressures, thermal and mechanical shocks and temperatures in excess of 135° C. includes a plastic sealant bushing radially compressed against the battery lead post by an outer metal sleeve, and two pairs of retainer rings, the first ring of each pair having sufficient elasticity to be press-fitted between the lead post and the sleeve to abut against an end of the bushing, and the second ring of each pair being of a rigid material and abutting against the first ring. The lead post extends through the sleeve at either end thereof. A hub is located on the lead post near one end of the sleeve and a portion of the lead post which extends beyond the sleeve at the other end is threaded. The bushing is then axially compressed between the ring pairs by drawing down a nut on the threaded end of the lead post.

6 Claims, 2 Drawing Figures

Patented July 18, 1972 3,678,178
FIG. 1
FIG. 2
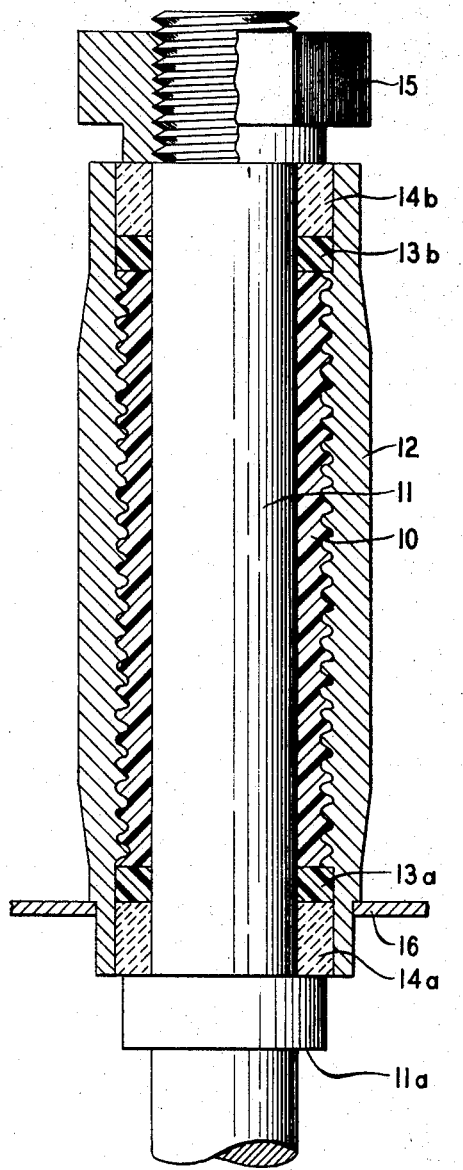
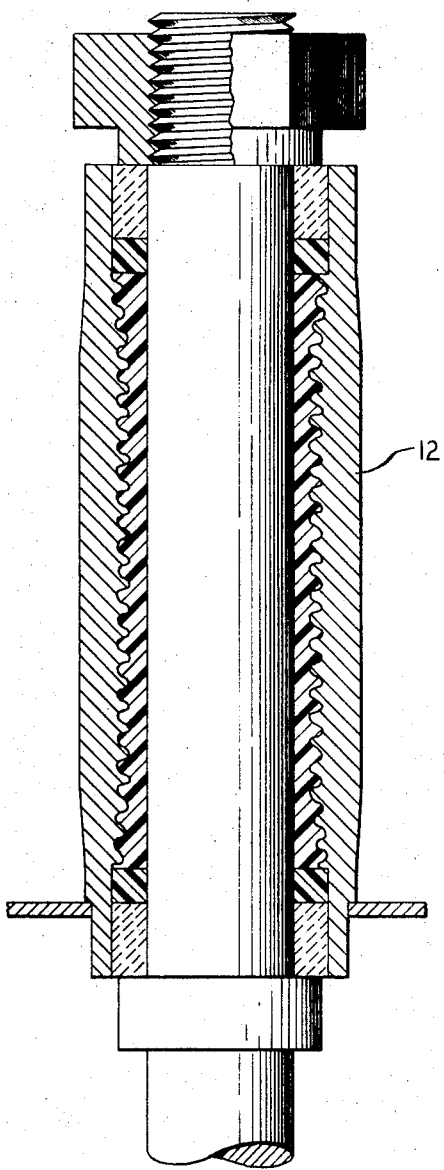

HIGH TEMPERATURE COMPRESSION SEAL TERMINAL

BACKGROUND OF THE INVENTION

1. Field of the Invention

This invention relates to a high temperature compression seal terminal, and more particularly to such a seal terminal including a plastic dielectric sealant.

2. Prior Art

Electrical parts are often placed in hermetically sealed containers to protect them from ambient conditions such as high pressure, high temperature, oxygen, water vapor, etc. Such components include batteries, electronic components, switches, memories, etc. The electrical leads for the parts must of course be brought out through the hermetic terminal seals, and thus the seal must include a dielectric material which will provide both electrical insulation from the container as well as physical isolation from the ambient. Such materials have in the past included various glasses, ceramics, plastics and rubbers.

Glass and ceramics have in the past ordinarily been used to withstand high pressures, such as sometimes develop within alkaline storage batteries. However, glass-to-metal and ceramic-to-metal seals ordinarily cannot withstand thermal and mechanical shocks often encountered during use, and are often expensive to produce.

Thus, alternative high pressure seals were developed, two of which are described in U.S. Pat. Nos. 2,957,041 and 3,109,055, both assigned to the present assignee. The first type of seal (U.S. Pat. No. 2,957,041) included a hard, tough plastic within a metal sleeve squeezed to place the plastic under compression against the lead. Ceramic plugs at either end of the plastic helped to maintain the compressive seal by applying stress axially. The second type of seal (U.S. Pat. No. 3,109,055) was essentially designed as a less expensive improvement over the first seal, and eliminated the ceramic plugs. Axial stress upon the seal was maintained by matching threads in the inside surface of outer sleeve and the outside surface of a tough, machinable plastic sealant.

This latter seal has proved an excellent design to withstand high pressures at low to moderate ambient temperatures. However, at temperatures of about 135° C. or above, the plastic flows, thus destroying the seal. Such temperatures may be encountered in batteries during high rate periodic discharge (e.g., engine starting), inside enclosures containing continuously operating electronic equipment, mounted outdoors in hot climates (e.g., deserts), and during sterilizations required for space probes. Return to the seal design of U.S. Pat. No. 2,957,041 is not attractive due to the expense involved in the machining of the ceramic plugs to the close tolerances required.

Thus, there is lacking at present a seal design which is capable of withstanding both high pressure and high temperature, has good thermal and mechanical shock resistance, and is inexpensive to produce.

SUMMARY OF THE INVENTION

A high-pressure compression seal terminal has been designed which is both thermal and mechanical shock resistant and capable of withstanding temperatures in excess of 135° C. This seal design utilizes a plastic sealant bushing radially compressed against the terminal lead by an outer relatively heavy walled metal sleeve, and two pairs of retainer rings, one at either end of the bushing, to prevent loss by extrusion of the sealant. The first ring of each pair is of a material having sufficient elasticity to be press-fitted between the terminal lead and an outer metallic sleeve to abut against an end of the bushing, but having significantly less flowability at elevated temperatures than the bushing material. The second ring of each pair is of a rigid material which maintains its rigidity at elevated temperatures and abuts against the first ring. Use of the first ring thus avoids the need for machining of the second rigid ring to close tolerances to prevent loss of the seal at such temperatures.

The external surface of the bushing and the internal surface of the sleeve preferably have matching threads to provide additional retaining stresses within the bushing.

The lead is preferably a post having a hub and a threaded portion, the threads beginning a distance from the hub approximately equal to the combined length of the bushing and ring assembly, and extending to the end of the post. A nut drawn down upon the post will thus result in the application of compressive stress axially on the bushing and to securing of the assembly between the hub and nut.

The seal terminal is particularly suitable for use in alkaline electrolytic cells destined to be subjected to temperatures in excess of 135° C. In such applications, of course, the materials chosen for the rings must be chemically inert to the cell chemicals or at least compatible therewith.

The sleeve is either an integral part of an end plate of a container or is a separate member hermetically secured to the end plate prior to formation of the seal.

BRIEF DESCRIPTION OF THE DRAWING

FIG. 1 is a front elevational view, partly in section, of one embodiment of a terminal seal in accordance with the invention, showing the relationship between the bushing and the outer sleeve prior to radial compression of the sleeve; and FIG. 2 is the same as FIG. 1 after the sleeve has been radially compressed about the bushing.

DETAILED DESCRIPTION OF THE INVENTION

Referring to FIG. 1, there is shown plastic bushing 10 positioned between lead-in post 11 and outer relatively heavy-walled metal sleeve 12. A preferred material for bushing 10 is polypropylene, a dielectric thermoplastic which is readily injection molded. It has practically no moisture permeability and thereby provides an effective vapor seal. Other suitable bushing materials, which are readily machinable, and may be injection-molded, are polytrifluorochloroethylene, sold under the trademark Kel-F, fluorinated ethylene propylene, sold under the trademark FEP Teflon, and the linear polyamides commonly referred to as nylon.

The threads on the outer surface of bushing 10 and the inner surface of sleeve 12 are preferably designed to conform to one another as closely as possible when sleeve 12 is compressed, in order to insure against the existence of leakage paths. Of course, when the bushing material is injection-molded into place, there is no need for accurate machining of threads in sleeve 12. A small pitch is preferred, since it increases the number of roots and crests of the thread, thus increasing the number of points at which axial stress is exerted upon the bushing. A more detailed description of suitable thread characteristics may be found in U.S. Pat. No. 3,109,055, issued to A. W. Ziegler on Oct. 29, 1963, and assigned to the assignee of this application.

Sleeve 12 may be formed from any of the several materials used for such purposes in the art, as the seal formed in accordance with this invention is ordinarily not dependent upon the chemical properties of the metal parts. Aluminum, brass, copper, nickel, silver alloys and steel are but exemplary of suitable sleeve materials. However, in certain applications subjecting the seal terminal to corrosive conditions, certain sleeve materials may be preferred. For example, for use with alkaline electrolytic cells, stainless steel or nickel-plated steel are preferred. Similarly, terminal post 11 may be of any of the several conductor materials known in the art such as brass, bronze, copper, Monel metal, nickel, nickel silver and phosphor bronze. However, nickel is preferred for use in alkaline electrolytic cells because of its resistance to alkalies. The portion of post 11 which extends downward from hub 11a either is electrically connected to the lead of the electrical apparatus, at a point not shown, or is an integral part of the lead itself.

The retainer rings 13a and 13b are shown in abutment against the ends of bushing 10. These rings are press-fitted into place.

A press fit is, of course, one in which the outside diameter of the ring is the same as the inside diameter of the sleeve. Thus, this ring material must be readily machinable, and have sufficient elasticity to form a tight seal without cracking. It must also have appreciably less flowability at elevated temperatures than the bushing material, in order to avoid the necessity for machining the rings 14a and 14b, which abut rings 13a and 13b, to close tolerances. An excellent type of material for this purpose is a polytetrafluoroethylene resin referred to commercially as TFE Teflon. These materials have an elongation at 73° F. from 100 to 200 percent, a deformation under a 2,000 psi load in 24 hours at 78° F. of 15 percent, and a heat-distortion temperature at a 66 psi load of 250° F. In addition, these materials are highly inert to corrosive environment, such as that encountered in alkaline electrolytic cells.

The second ring (14a, 14b) must be of a material which is essentially rigid at all temperatures encountered under foreseeable operating conditions. Materials which are suitable for this purpose and which are also highly inert to a corrosive environment include high purity polycrystalline alumina ($Al_2O_3$) and zirconia ($ZrO_2$) ceramics.

High purity $Al_2O_3$ or $ZrO_2$ are particularly suitable for use with alkaline electrolytic cells since they are highly inert to potassium hydroxide and other cell chemicals. Machining to a size which would result in a clearance of not more than about 1 mil between the ring and the sleeve 12, or about 2 mils between the ring and the post 11, will ordinarily result in a structure in which the retaining ring (13a, 13b) will not flow through the clearance but will maintain the seal, even at temperatures up to about 135° C. for extended periods of time, or up to about 160° to 250° C. for a few minutes, depending on the bushing material used.

Of course, other materials may be used for the retaining rings so long as they achieve the objective of maintaining the seal at elevated temperatures without the necessity for very accurate sizing or machining of the rings. Thus, the first ring (13a, 13b) may be of any material which in general exhibits significantly less flow under pressure at elevated temperatures than the bushing material 10 but which is not so inelastic as to require accurate machining for a press fit. The second ring material (14a, 14b) must essentially be inelastic at all temperatures to which the seal will be subjected. Of course, both must be electrically insulating to maintain electrical integrity of the lead post 11.

A certain amount of variation in design within the above limits will permit some latitude in choice of materials. Accordingly, machining of the rigid ring to closer tolerances would permit use at higher temperatures for a given material for the first ring or would permit use of different material having a flow rate which is higher than would be acceptable in the case in which the first material is machined to less stringent tolerances.

A further advantage of the seal design resides in the manner in which the rings are maintained in abutment against the bushing material. Post 11 possesses a hub portion 11a having an outside diameter larger than the inside diameter of rings 13a, 13b, 14a, and 14b so that the seal assembly abuts against the hub 11a. The hub is positioned on the post 11 at a distance from one end thereof sufficient to allow a substantial portion of the post to extend beyond the opposite end of sleeve 12. This portion of post 11 which extends beyond the end of sleeve 12 is threaded to accept retaining nut 15. Thus, drawing down nut 15 upon the threaded post puts the bushing in axial compression between the ring assemblies. This arrangement avoids the necessity for threading the rigid ring material. The diameter of the hub 11a and of the lower portion of nut 15 is not critical and may be appreciably smaller than the outside diameter of rigid rings 14a and 14b. This is, of course, desirable since it insures against accidental shorting of the terminal due to contact between post 11 and sleeve 12. In FIG. 1, the sleeve portion of the terminal seal is shown hermetically attached to a metal enclosure 16.

Of course, hub portion 11a on post 11 need not be an integral part thereof. It may, for example, be a separate metal ring secured at the desired position by any suitable means such as one or more hub screws. The thickness of the lead-in post is shown to be appreciably larger than that of lead-ins shown in prior art seals and is advantageous in that it provides the mechanical strength needed for securing the rings in abutment against the bushing material.

After the nut 15 has been drawn down as described above, the metal sleeve 12 is compressed about bushing 10. This is preferably carried out by a tool that applies a substantially uniform compressive force to the entire circumference of the portion of the sleeve that the tool engages. By applying such force to a relatively heavy-walled sleeve, the sleeve is uniformly compressed about the bushing. A relatively heavy-walled sleeve is one that cold flows evenly when subjected to a compressive force. The sleeve is tapered slightly at either end to prevent compression along its entire length, since such could result in cracking of the ceramic rings.

FIG. 2 shows the condition of the assembly after compression of sleeve 12.

EXAMPLE

Five high temperature terminal seals were prepared in accordance with the teachings of the invention. The bushing material utilized was a polypropylene having a melt flow rate of 3.5 grams per 10 minutes, determined by ASTM procedure D 1238–70 condition L, which was injection molded in place to form a threaded bushing similar to that shown in the drawing, having an inside diameter of 0.250 inch, and an external thread having a major diameter of three-eighths inch. The first retaining ring was TFE Teflon, the second ring was a high alumina ceramic containing 99.5 percent $Al_2O_3$. The Teflon ring was machined to an outside diameter of 0.375 inch and an inside diameter of 0.250 inch. The ceramic ring was machined to an outside diameter of 0.374 inch and an inside diameter of 0.252 inch leaving a clearance between the ring and the compressible sleeve of about 1 mil and between the ring and the lead-in post of about 2 mils. The rings were secured in abutment against the bushing by drawing down a nut on the threaded and hubbed lead-in post. The sleeve material was 304 L stainless steel; the sleeve had an outside diameter of 0.500 inch, an inside diameter of 0.375 inch, an internal thread having a major diameter of three-eighths inch, and was compressed to an outside diameter of 0.470 inch. The thus-formed seals were incorporated into alkaline nickel cadmium cells and the assemblies were then sterilized by maintaining them at 275° F. for 72 hours and were then subjected to 500 thermal cycles. Each cycle involved a temperature change from −40° to +160° F. within 2 hours. None of the seals appeared to be damaged after these test conditions were carried out.

The invention has necessarily been described in terms of selected preferred embodiments. Other embodiments are, of course, contemplated. For example, in some situations it may be desirable to use the terminal merely as a plug and in this instance the lead-in conductors are eliminated and the bushing is a solid member.

What is claimed is:

1. A high-temperature compression seal terminal comprising: (1) a cylindrical sealing bushing, (2) a lead-in conductor extending through the bushing, (3) an outer metallic sleeve encompassing the bushing, the sleeve being circumferentially deformed along its length to radially compress the bushing, and (4) means for both retaining the bushing within the sleeve and compressing the bushing axially; characterized in that the retaining means consists of two pairs of retaining rings, a first elastic ring of each pair in abutment against an end of the bushing, and a second rigid ring of each pair in abutment against the first ring.

2. The terminal of claim 1 in which the external surface of the sealing bushing and the internal surface of the sleeve are threaded to provide additional retaining stresses within the bushing.

3. The terminal of claim 1 in which the lead-in conductor is a post having a hub abutting against the outside of the second ring at one end of the sleeve, and threaded on the other end to at least the other end of the sleeve to accept a threaded nut and in which the nut is drawn down on the threads to but against a second ring on the other end of the sleeve, so that the retainer rings are compressed against the bushing between the hub and nut.

4. The terminal of claim 1 in which the bushing material is polypropylene having a melt flow rate of 3.5 grams per 10 minutes.

5. The terminal of claim 1 in which the elastic ring material is a polytetrafluoroethylene having an elongation at 73° F. of from 100 to 200 percent, and a deformation under a 200 psi load in 24 hours at 78° F. of about 15 percent, and a heat-distortion temperature at a 66 psi load of about 25° F.

6. The terminal of claim 1 in which the rigid ring material is a high alumina ceramic containing at least 99.5 percent $Al_2O_3$.

* * * * *